United States Patent [19]

Swasey et al.

[11] Patent Number: 4,571,096
[45] Date of Patent: Feb. 18, 1986

[54] SELF-ADJUSTING MINIMUM CLEARANCE BEARING

[75] Inventors: Archie N. Swasey, Oxford; William J. Winter, Trumbull, both of Conn.

[73] Assignee: USM Corporation, Farmington, Conn.

[21] Appl. No.: 602,539

[22] Filed: Apr. 20, 1984

[51] Int. Cl.[4] .............................................. F16C 23/00
[52] U.S. Cl. .................................................... 384/266
[58] Field of Search ................ 384/99, 215, 247, 252, 384/261, 263, 266, 267, 273

[56] References Cited

U.S. PATENT DOCUMENTS

| | | | |
|---|---|---|---|
| 1,588,138 | 6/1926 | Neilson | 384/266 X |
| 1,952,525 | 3/1934 | Arms | 384/266 |
| 2,133,476 | 10/1938 | Scaife | 384/266 X |
| 2,171,887 | 9/1939 | Nye | 384/266 |
| 3,679,272 | 7/1972 | Costa et al. | 384/99 |

Primary Examiner—Stuart S. Levy
Assistant Examiner—David Werner
Attorney, Agent, or Firm—Aubrey C. Brine

[57] ABSTRACT

A bearing assembly for roll journals comprising a bearing box having one piece of a semi-cylindrical sleeve and fixed relative to a nip line of a roll. A bearing box having the other piece of the bearing sleeve is movable toward a roll journal resting on the first piece to provide a minimum clearance between the roll journal and the bearing sleeve.

4 Claims, 2 Drawing Figures

SELF-ADJUSTING MINIMUM CLEARANCE BEARING

FIELD OF THE INVENTION

This invention relates to bearing assemblies for roll journals.

DESCRIPTION OF THE PRIOR ART

In calendering or otherwise processing plastic and/or sheet material between two or more cooperating rolls, it is essential to maintain a precisely controlled gap or nip between the rolls. It is known that even large diameter rolls bend under calendering forces so that the gap at the center of the rolls is greater than at the ends. To counter such bending it is known to counterbend one or both cooperating rolls or to cross the roll axes to cause the gap to be uniform from end to end. U.S. Pat. No. 4,364,158 shows a simplified means for counterbending rolls. Typical means for crossing the axes of rolls are shown in U.S. Pat. No. 2,965,920.

It has been found that with sleeve type bearings, that the heavy loads usually encountered cause the sleeves to wear into elliptical shape providing excessive clearance between the sleeve bearing and the roll journal. This excessive clearance permits the roll to "float" toward and away from a cooperating roll causing the gage or thickness of a sheet being calendered to vary to an undesirable extent depending on varying the pressure of the material passing through the nip between the rolls. Such thickness variation causes considerable spoilage of sheet being formed especially when the plastic being calendered is transparent or the desired sheet thickness is small. When spoilage becomes excessive, the bearing sleeves must be replaced resulting in costly repairs and "down time" of the machinery.

Accordingly, it is a general object of the invention to provide a self adjusting sleeve bearing which prevents excessive bearing clearance and a resultant inability to maintain a uniform thickness of a sheet being calendered.

SUMMARY OF THE INVENTION

There is provided a roll journal bearing including a pair of opposed bearing boxes each having one half of a two piece bearing sleeve. One of the boxes is located relative to a roll nip and the other is pressed toward the one box so the other half of the sleeve bearing provides only a minimum clearance with the roll journal.

DESCRIPTION OF THE PREFERRED EMBODIMENT

Figure 1:
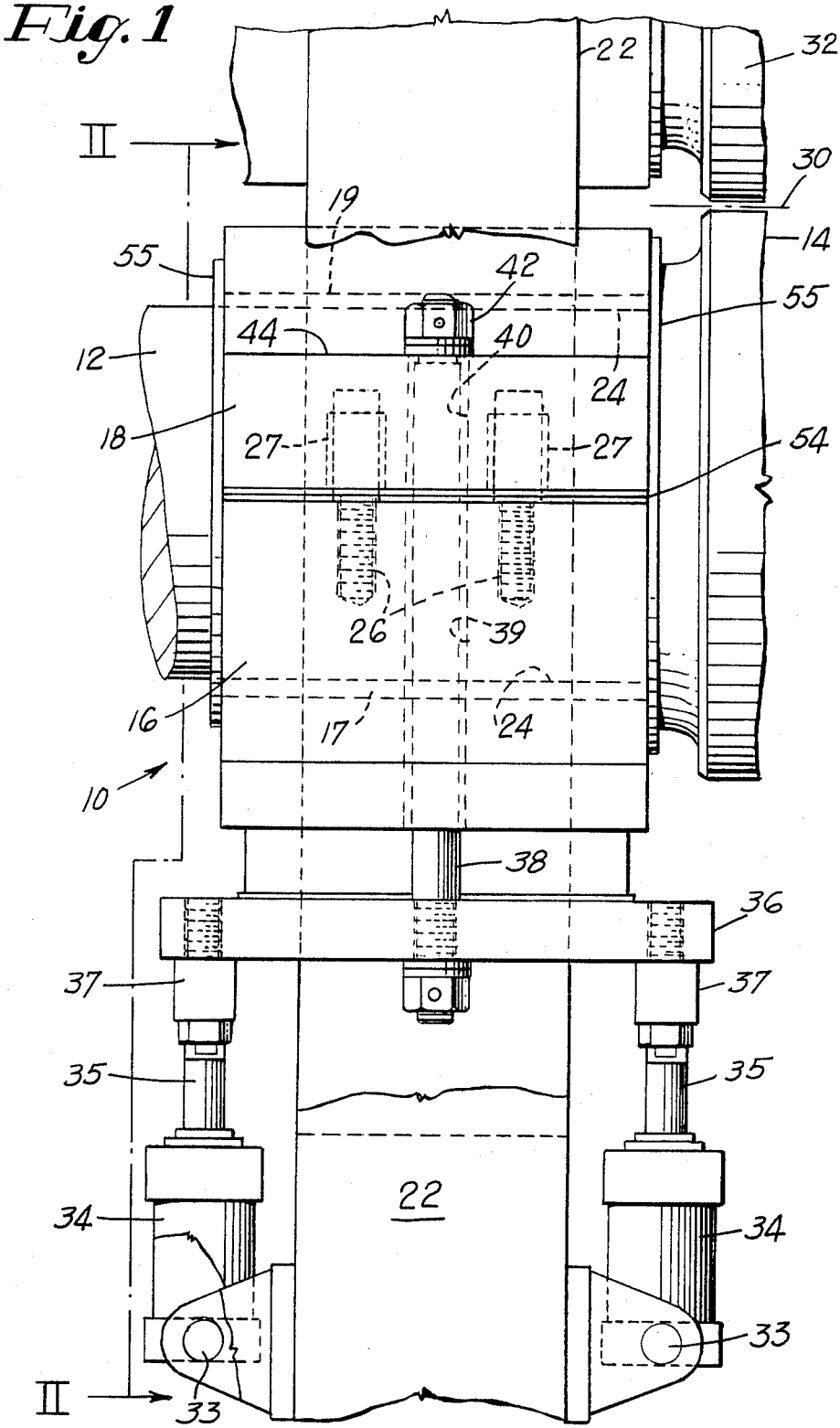
FIG. 1 is a side elevation of a self adjusting roll journal bearing assembly embodying the invention.

In the drawings there is shown a bearing assembly 10 for rotatably mounting a journal 12 at one end of a calender roll 14. The assembly includes a bearing box 16 having a semi-cylindrical piece 17 and an opposed bearing box 18 having a semi-cylindrical piece 19. The bearing boxes 16 and 18 are mounted for unitary and individual movements along guide surfaces 20 of a frame 22 and are spaced apart so that the pieces 17 and 19 form a two-piece sleeve bearing 24 in which the journal of the roll 14 is mounted for rotation.

Figure 2:
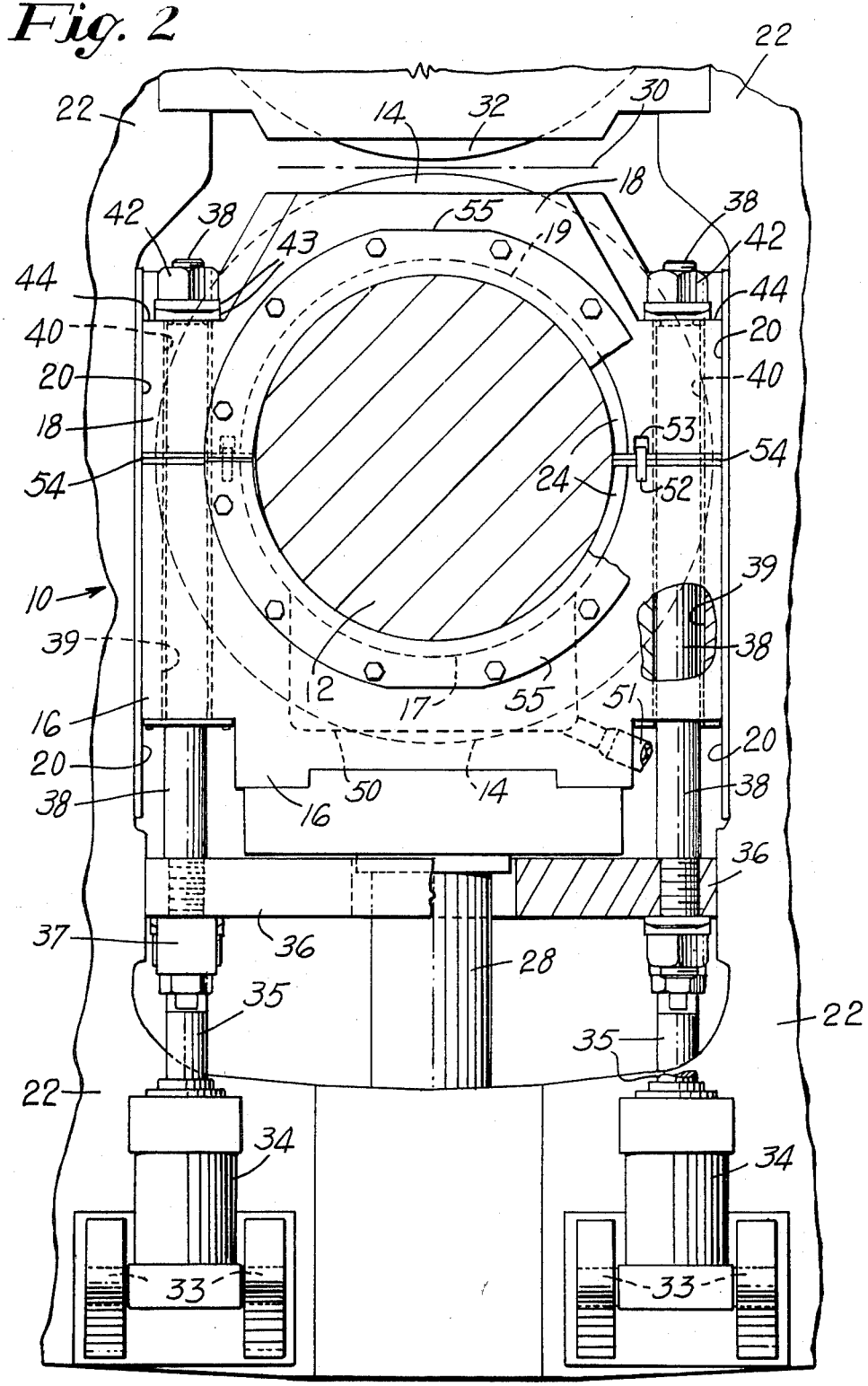
FIG. 2 is a section taken on line II—II of FIG. 1.

The bearing box 16 is provided at opposite sides of the journal 12 with studs 26 which project into guide bushings 27 in the bearing box 18 so that during any relative movement, the boxes and their sleeve pieces 17 and 19 maintain their parallel relation. As shown in FIG. 2, the box 16 is adjustable in a well-known manner such as shown in U.S. Pat. No. 2,965,920 by rotation of a screw shaft 28 mounted in the frame 22. Rotation of the screw shaft 28 adjusts the box 16 and its roll 14 relative to a nip line 30 between the roll 14 and a cooperating roll 32. The space between the rolls 14 and 32 determines the thickness of a sheet being formed between the rolls, with the rolls being driven in any convenient manner such as electric or hydraulic motors not shown. The location of the roll 14 is adjustably fixed by the adjusting screw shaft 28 which precisely determines the location of the sleeve bearing piece 17 and the journal 12 resting therein.

The bearing sleeve piece 19 is pressed toward the upper side of the journal 12 by pairs of cylinders 34 mounted at 33 on the frame 22 at opposite sides of the journal 12. Piston rods 35 extending upwardly from the cylinders are connected to a load plate 36 through flexible couplers 37. The load plate 36 is provided with rods 38 which extend loosely through holes 39 and 40 in the bearing box 16 and 18, respectively. The upper ends of rods 38 are threaded to receive nuts 42, there being spherical washers 43 between the nuts 42 and surfaces 44 on the upper sides of the bearing box 18. By introduction of fluid pressure to the cylinders 34 the bearing box 18 is moved toward the bearing box 16 to press the sleeve piece 19 toward the sleeve piece 17 to provide a minimum clearance between the journal 12 and the two-piece sleeve bearing 24. The flexible arrangement is such that the sleeve bearing maintains axial alignment with the journal 12 during any bending of the roll 14.

To lubricate the clearance between the journal and the sleeve bearing either or both bearing boxes may be provided with chambers 50 which may be supplied with lubricant through pipes 51. It should be apparent that lubricant can be supplied under any desired pressure sufficient to lubricate the minimum clearance between the sleeve bearing 24 and the journal 12 and/or to provide a hydrostatic bearing therebetween. To retain the lubricant in the bearing, the box 16 is provided with two strip seals 52 which extend into slots 53 in the box 18. Outboard of the strip seals resilient seals 54 fill the clearance space between the boxes 16, 18. Split, ringlike, labyrinth seals 55 secured at opposite ends of the bearing box further prevent lubricant leakage.

While a vertically arranged stack of two rolls is shown and described, it should be apparent that other numbers of rolls and other horizontal or angular disposition of the rolls could be used without departing from the scope of the invention. Likewise, the novel bearing assembly could be used on any one or more of a stack of rolls regardless of whether the roll bearings are fixed or movable. It should also be apparent that the bearing assembly could be used in new machinery or to replace existing bearings.

Having thus described our invention what we claim as new and desire to secure by Letter Patent of the United States is:

1. A bearing for roll journals comprising a two piece bearing sleeve rotatably receiving a journal of a roll; a pair of opposed bearing boxes each receiving one piece of the bearing sleeve, means for mounting the bearing boxes for movement toward and away from each other diametrically of a journal in the bearing sleeve, said mounting means including a loading plate, means for locating one of the bearing boxes in the mounting means at a predetermined position for locating one of the bearing sleeve pieces and the roll journal therein with respect to a roll nip, means for moving the other bearing box in the mounting means diametrically toward the one bearing box for pressing the other bearing sleeve piece toward the journal to provide a minimum clearance between the bearing sleeve pieces and the journal, said moving means including fluid operated piston cylinder devices secured at opposite sides of the journal to said load plate which in turn is connected to the other bearing box by rods loosely passing through the one bearing box, the rods being flexibly connected to the other bearing box to permit the bearing assembly to follow bending movements of the roll journals.

2. A bearing according to claim 1 in which guide studs arranged between the bearing boxes to maintain the sleeve bearing pieces in coaxial parallel relation.

3. A bearing according to claim 2 in which the guide studs are arranged in pairs at opposite sides of the roll journal with the stud of each pair being arranged at opposite sides of each load rod.

4. A bearing according to claim 1 in which the minimum clearance provides sufficient space for lubrication between the sleeve and the journal.

* * * * *